(12) United States Patent
Hill

(10) Patent No.: US 10,593,067 B2
(45) Date of Patent: Mar. 17, 2020

(54) INTELLIGENT SYSTEMS AND METHODS FOR DYNAMIC COLOR HIERARCHY AND AESTHETIC DESIGN COMPUTATION

(71) Applicant: Jamison Hill, Mesa, AZ (US)

(72) Inventor: Jamison Hill, Mesa, AZ (US)

( * ) Notice: Subject to any disclaimer, the term of this patent is extended or adjusted under 35 U.S.C. 154(b) by 0 days.

(21) Appl. No.: 15/702,718

(22) Filed: Sep. 12, 2017

(65) Prior Publication Data

US 2019/0080488 A1    Mar. 14, 2019

(51) Int. Cl.
*G06T 11/00* (2006.01)
*G06F 8/20* (2018.01)
*G06F 8/34* (2018.01)

(52) U.S. Cl.
CPC .............. *G06T 11/001* (2013.01); *G06F 8/20* (2013.01); *G06F 8/34* (2013.01)

(58) Field of Classification Search
CPC ............ G09G 5/02; G09G 5/06; G06T 11/001
See application file for complete search history.

(56) References Cited

U.S. PATENT DOCUMENTS 8,319,788 B2 * 11/2012 Buzyn ................... G06F 3/0481
345/594
2018/0005409 A1 * 1/2018 Aksoy ................... G06T 11/001

* cited by examiner

*Primary Examiner* — Antonio A Caschera
(74) *Attorney, Agent, or Firm* — The Roy Gross Law Firm, LLC; Roy Gross

(57) ABSTRACT

Inventive systems and methods for selecting color design elements. Methods and systems for selecting and generating color-palette data elements for a software program such as for example visual representations, and producing executable software based at least in part on the color palette data selected and generated.

17 Claims, 9 Drawing Sheets
(5 of 9 Drawing Sheet(s) Filed in Color)

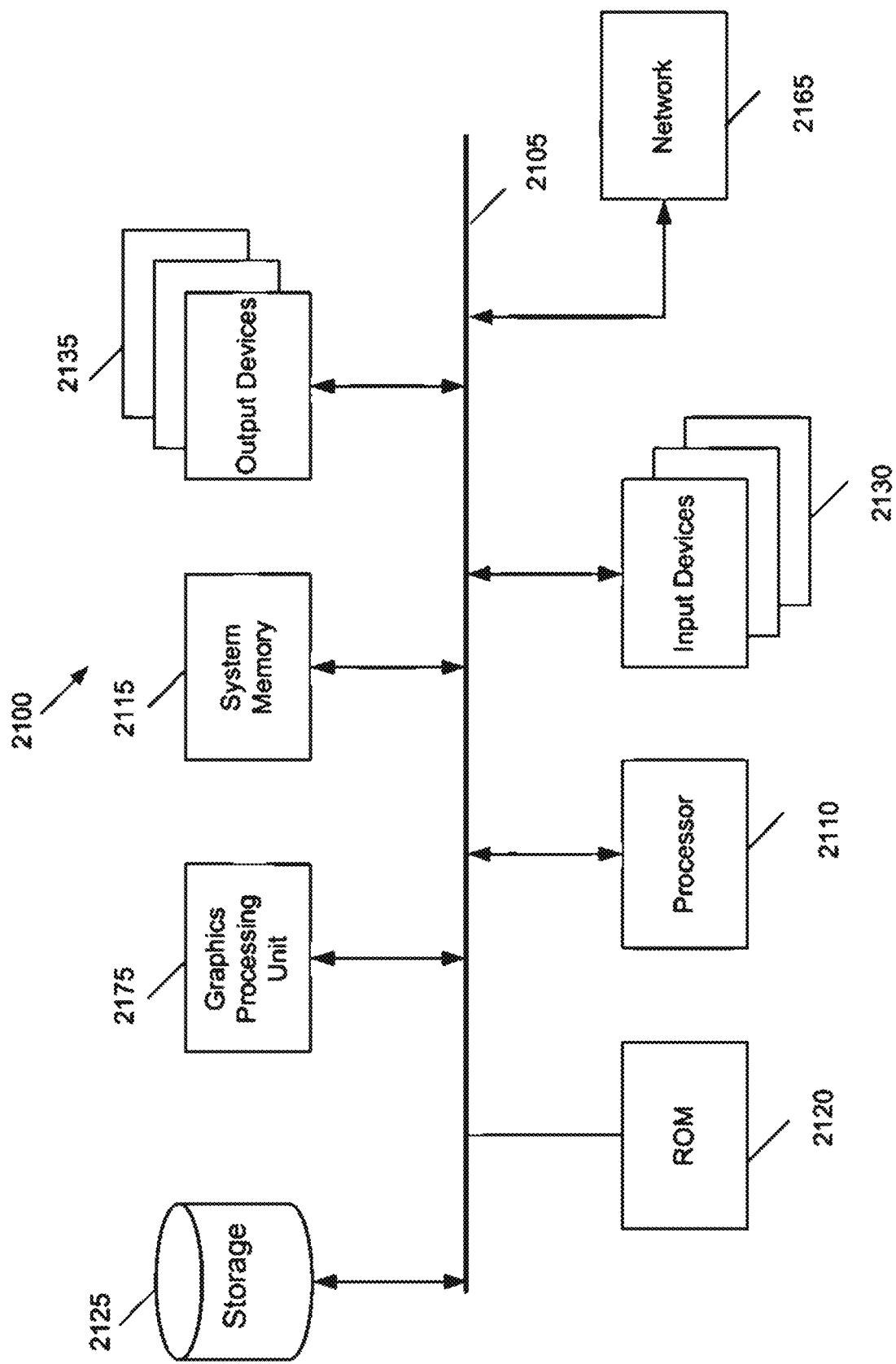

US 10,593,067 B2

INTELLIGENT SYSTEMS AND METHODS FOR DYNAMIC COLOR HIERARCHY AND AESTHETIC DESIGN COMPUTATION

FIELD OF THE INVENTION

The invention is directed to systems and methods for selecting color design elements. More specifically, the invention is directed to selecting and generating color-palette data elements for a software program, and producing executable design output based at least in part on the color palette data selected and generated.

BACKGROUND OF THE INVENTION

The creation of digital and non-digital design output using software is difficult. Various technical fields, such as industrial design, architecture, fashion, interior design, communications, marketing, and the arts use software to create various digital and non-digital designs and/or design outputs. These design outputs are used in various media such as magazines, newspapers, software applications, and of course, on websites on the internet.

In particular, selecting colors and using appropriate colors that are aesthetically pleasing is difficult. In fields such as website development, often it is very difficult to find an aesthetically pleasing color configuration that grabs the attention of users. Many websites suffer from disadvantages of having poor color choices.

Existing tools that help build websites suffer from the limitations on the skills of users and do not provide an adequate solution that allows users to create aesthetically pleasing websites with professional looking color elements. This is because selecting professional looking colors is a complex process and color or color theory is a complex science.

Color may be defined as the characteristic of human visual perception described through categorizing those perceptions with names (in English) such as red, blue, yellow, green, orange, purple, and the like. This human color perception is the result of eye cone cell stimulation by a spectrum of electromagnetic radiation called "visible light".

By scientifically defining a color space or model, colors can be identified numerically by coordinates or other criteria. For example, the RGB color model corresponds to human trichromacy and the three primary cone cell types that respond to three bands of light: long wavelengths, peaking near 564-580 nanometers (red); medium-wavelength, peaking near 534-545 nanometers (green); and short-wavelength light, near 420-440 nanometers (blue). However, there are also popular and divergent color space models which use more than three color dimensions in other defined color spaces, such as in the CMYK color model. To add a layer of complexity, besides standard color spaces such as sRGB, proprietary color space systems are also prevalent, such as Adobe® RGB, ProPhoto® RGB, and ColorMatch RGB.

Color science is also called chromatics, or colorimetry; and, includes the perception of color not just by the human eye but also the brain. Many medical researchers consider the eyes an extension of and integral part of the brain, and when considered together (eyes and brain) it has been estimated that humans can perceive and distinguish roughly ten-million different "colors".

A designer having ten-million distinguishable colors with which to create a pleasing or inversely a shocking or attention getting interface may encounter "a creative problem" when having to pick colors or color elements for a digital and non-digital design output, and in particular a website or mobile application.

Thus, it is desired to provide a method and system to overcome the above-mentioned disadvantages in the prior art and to allow users to select color design elements to create an aesthetically pleasing color configuration that grabs the attention of users for websites, software, and digital and non-digital design outputs.

SUMMARY OF THE INVENTION

It is an object of the invention to provide methods and systems to select color design elements.

It is an object of the invention to provide methods and systems to select color design elements that are aesthetically pleasing.

It is an object of the invention to determine how, in a variety of ways, colors can be applied to a design output, such as a website, social media ad, software UI, mobile app UI, digital media designs, and the like.

It is an object of the invention to provide methods and systems to provide various sets of color design elements for various output and media.

These and other objects of the invention are achieved by providing a system for producing color-palette data elements for a software program, the system comprising: a processor; and software executing on the processor configured to: receive a baseline color-palette element; calculate various color combinations using the baseline color-palette element to create a set of outputs of color-palette elements; and produce a design output including the set of color-palette elements.

In certain embodiments, the software calculates various color combinations using the baseline color-palette element by: assigning a digital value to the baseline color-palette element; generating a series of color-palette elements having attributes similar to the baseline color-palette element; and assigning digital values to the series of generated color-palette elements.

In certain embodiments, the design output includes a series of the digital values of the generated color-palette elements.

In certain embodiments, the attributes similar to the baseline color palette elements includes chroma and/or luma values of the baseline color-palette element.

In certain embodiments, the software generates a series of color-palette elements by: analyzing the chroma and/or luma values of the baseline element; increasing the chroma and/or luma values by adding white to the baseline element; and generating at least one color-palette element having a chroma and/or luma value greater than the baseline element.

In certain embodiments, the software generates a series of color-palette elements by: analyzing the chroma and/or luma values of the baseline element; decreasing the chroma and/or luma values by adding black to the baseline element; and generating at least one color-palette element having a chroma and/or luma value less than the baseline element.

In certain embodiments, the software generates a series of color-palette elements by generating a range of color-palette elements having a greater hue intensity and a lesser hue intensity that the baseline color-palette element.

In certain embodiments, the software comprises a rule to generate the series of color-palette elements, the rule comprising: mapping the chroma and/or luma values of the baseline color-palette element according to a chart from −20 to +20, −20 representing the lightest color ranking and +20 representing the darkest color ranging; generating a series of color-palette elements having chroma and/or luma values that are within a range of five color rankings.

In certain embodiments, the software receives a second baseline color-palette element, wherein the software generates a second series of digital values of generated color-palette elements similar to the second baseline color-palette element.

In certain embodiments, the system is automatic.

In certain embodiments, the design output is for a software code or for a software program.

In certain embodiments, the design output produced by the system is software code, an image, a design file formatted for various software-based design applications, an animation, a file, instructions on how to design a prescribed color design output, website code and/or static media content.

In certain embodiments, the color design output produced by the system is a modification to an existing color design output.

In certain embodiments, the digital values include hex values, rgb values, rgba values, and combinations thereof.

In certain embodiments, the system includes a user interface (UI) or a graphical user interface (GUI).

In certain embodiments, the user interface allows a user to input the baseline color-palette element.

In certain embodiments, the color provided to the system or method is defined by a user.

In certain embodiments, the color or colors provided can be any colors.

In certain embodiments, the color or colors provided to the system or inputted into the system is in a digital format, such as a hex value, rgb value, rgba value.

In certain embodiments, the design output is thumbnail representations of a design output, prescriptive instructions on how to apply colors to an object, computer code, design files, image files, various design outputs and real-world applications.

In certain embodiments, the design outputs can be rendered and previewed on a digital device, downloaded, or previewed in any way.

In certain embodiments, design outputs are displayed and arranged in various ways. Such ways comprise by one or more attributes of the outputs, one or more colors of the outputs, etc.

In certain embodiments, design outputs may or may not include every color of the color subset. In certain embodiments, design outputs may include colors not included in the subset.

In certain embodiments, the visual output of color combinations may include information regarding the color contrast of its prescribed foreground and background elements. Such information may be used in determining the legibility and visibility of a given color combination output's prescription of foreground and background colors within an output combination.

Other objects of the invention are achieved by providing a method of and for mapping color-palette data elements for a software program, the method comprising the steps of: receiving a baseline color-palette element; calculating various color combinations using the baseline color-palette element to create a set of outputs of color-palette elements; and producing a design output including the set of color-palette elements.

In certain embodiments, the step of calculating comprises: assigning a digital value to the baseline color-palette element; generating a series of color-palette elements having attributes similar to the baseline color-palette element; and assigning digital values to the series of generated color-palette elements.

In certain embodiments, the design output includes a series of the digital values of the generated color-palette elements.

In certain embodiments, the step of receiving comprises a series of questions relating to color palettes, color application in a specimen, color flows, font preferences, image style preferences, icon style preferences, illustration style preferences and a combination thereof.

In certain embodiments, the design output is generated in real-time.

In certain embodiments, the design output is code for a website, an email, a mobile homepage, a user interface (UI), a software program, a pitch deck and social ad and a software dashboard, and combinations thereof.

In certain embodiments, the design output is generated based on rules using custom generated color preferences and is not based upon pre-existing templates or previously established colors.

In certain embodiments, the method is dynamic and wherein there are different sets of color-palette data elements presented to the user depending upon the previous color-palette data elements selected by the user.

In certain embodiments, the method includes providing an executable software program that performs the method steps.

In certain embodiments, the executable software program contains an interface, and wherein the interface is manipulated using a toggle control or a selector control.

In certain embodiments, the toggle control includes a right down arrow key, space bar, 4-way joystick.

In certain embodiments, the interface is hosted via a server or on a web site.

In certain embodiments, the design output is code for a website, code for an email, a mobile homepage, a pitch deck and social ad and a software dashboard, and combinations thereof.

In certain embodiments, the design output is for a user interface (UI).

In certain embodiments, the design output is a software code output suitable for a software program.

Other objects of the invention are achieved by providing a method of and for mapping color-palette data elements for a software program, the method comprising the steps of: providing an executable software program that receives a baseline color-palette element; assigning a digital value to the baseline color-palette element; generating a series of color-palette elements having attributes similar to the baseline color-palette element; assigning digital values to the series of generated color-palette elements; and producing a design code of the series of the digital values of the generated color-palette elements.

Other objects of the invention are achieved by providing a method of and for generating color-palette data elements for a software program, the method comprising the steps of: providing an executable software program which presents to and prompts a user to select at least one color-palette element from a first set of color-palette elements displayed to the user; wherein upon the user selecting the at least one color-palette element within the set, the executable software program then generates a first value based upon a chroma value and a luma value corresponding to the at least one color-palette element; wherein the executable software program then generates a second value based upon a rule set, the executable software program then compares the first value and second value and generates a third value based upon the comparison; wherein the executable software program presents to the user for selection a preview of at least one user interface incorporating a third set of at color-palette elements based on the third value; whereby upon a selection of a preview of at least one user interface incorporating a second set of at color-palette elements by the user, the executable software program produces software code output in accordance with the user at least one color-palette data element and the user interface preview selections.

Other objects of the invention are achieved by providing a method of and for generating color-palette data elements for a software program, the method comprising the steps of: present to and prompt a user to select at least one color-palette element from a first set of color-palette elements; upon the user selecting the at least one color-palette element within the set, generate a first value based upon a chroma value and a luma value which corresponds to the at least one color-palette element; generate a second value based upon a rule set and compare the first value and second value and generate a third value based upon the comparison; present to and prompt a user to select a preview of at least one user interface based upon a third set of at color-palette elements corresponding to the third value; and produce software code output in accordance with the user selected at least one color-palette data element and the user interface preview.

Other objects of the invention are achieved by providing a non-transitory computer readable storage medium storing a computer program product for selecting color elements for a software program, the non-transitory computer readable storage medium comprising: present to and prompt a user to select at least one color-palette element from a first set of color-palette elements; upon the user selecting the at least one color-palette element within the set, generate a first value based upon a chroma value and a luma value which corresponds to the at least one color-palette element; generate a second value based upon a rule set and compare the first value and second value and generate a third value based upon the comparison; present to and prompt a user to select a preview of at least one user interface based upon a third set of at color-palette elements corresponding to the third value; and produce software code output in accordance with the user selected at least one color-palette data element and the user interface preview.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 9 is a detailed view of the system architecture of an embodiment of the invention.

DETAILED DESCRIPTION OF THE INVENTION

Figure 1:
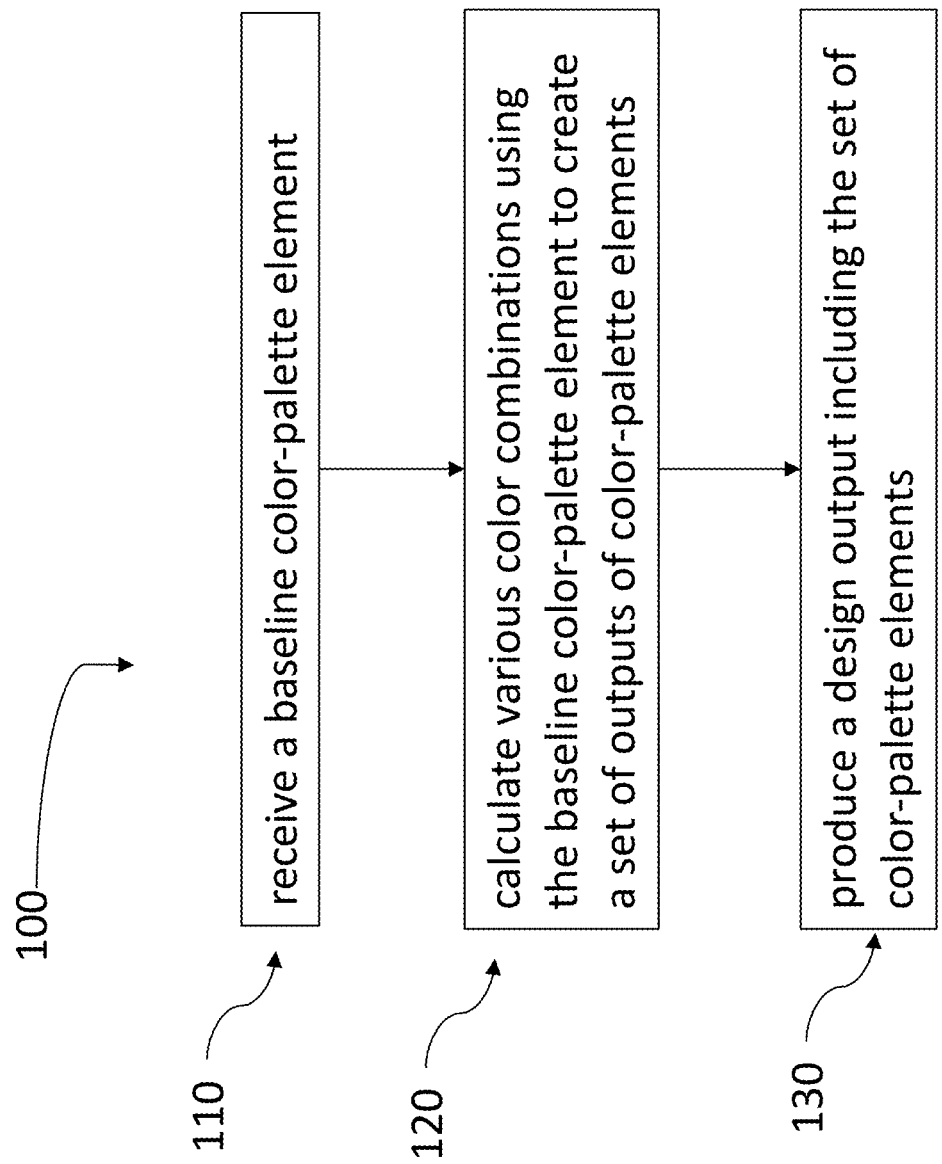
FIG. 1 is a schematic flowchart of a method of an embodiment of the invention.

This application herein incorporates by reference co-pending U.S. application Ser. No. 15/702,710 entitled "INTELLIGENT SYSTEMS AND METHODS OF PRODUCING DIGITAL AND NON-DIGITAL DESIGN OUTPUTS" filed on Sep. 12, 2017.

In the following description, numerous details are set forth for the purpose of explanation. However, one of ordinary skill in the art will realize that the invention may be practiced without the use of these specific details.

For ease of understanding and conceptual visualization, the inventive method and system is directed to providing methods of dynamic color hierarchy & aesthetic design computation.

Before this invention, the selection of color design elements and process thereof was almost exclusively done by hand. How colors could be applied to a design output was typically left up to the designer in charge of the design output to 1) conceive possible applications of the colors and 2) to manually apply the colors to a sample design output in the ways conceived. This is/was time intensive and often restricted creative options due to the laborious nature of the task.

The present invention involves an inventive system and method to assign colors to produce a design output. In certain embodiments of the invention, the method and system provides assigning color value attributes to any color that allow colors to be compared and mapped across color palettes.

In certain embodiments of the invention, the ability to add N number of color rules so that N possible applications of color for a given specimen could be produced, assuming matches to the colors occurs under the matching acceptance criteria defined in the system is satisfied.

In certain embodiments of the invention, the programmatic comparison of colors in a subset to the colors defined in a rule is used to determine possible applications of color.

In certain embodiments of the invention, the system and method produces high-quality design specimens that meet sound visual design standards by using a system with the ability to define and refine one or more output acceptance criteria.

In certain embodiments of the invention, the invention limits the manual work trying to conceive how colors could be applied to a given design specimen.

In certain embodiments, the system can be applied in a variety of applications and use-cases, including stand-alone applications or as a part of an external application.

Method and System for Using Questions to Create Color Output

In certain embodiments, the system provides a means to communicate the steps and hierarchy of question/topic structures for a given color design output to end users.

In certain embodiments, the system and method provides various questions or topics assist a user in choosing color design preferences for a color design output. The system and method creates a color design output, replaces digital assets for a color design output, configures external tools and resources to support the deployment of a color design output, and/or arranges color design output layouts.

In certain embodiments, the content, the system asks a series of questions to a user. In certain embodiments, the order or existence of system-generated questions or topics and their options may be influenced dynamically by previously-satisfied questions or topics provided to the user.

In certain embodiments, the questions or topics guide users to producing a website or web publishable content.

In certain embodiments, the color input types include an option to continue to the next question, a multiple-choice option, a text input and/or any other input type.

In certain embodiments, the value to satisfy a question or topic provided by the system for one or more questions or topics are system-generated.

In certain embodiments, the system provides a graphical user interface (GUI) that displays one or more topics or questions at a time to a user.

In certain embodiments, satisfying a question or topic automatically progresses the user to the next question or topic.

In certain embodiments, a user can preview options to a question or topic using a binary toggle and select an option with a selector.

In certain embodiments, the question or topics are satisfied by the input or selection of a single option from one or more options.

In certain embodiments, the system produces a visual representation of the color design output for the purpose of visualizing the context of one or more color design options for a given topic or question before and after a user finalizes on an answer of the question or topic at hand.

Progress Indicator

In certain embodiments, the system includes a progress indicator used to show the color output. The system produces a visual representation of the progress of the color design output in real-time as users satisfy each question or topic.

In certain embodiments, the progress indicator is a visual indicator of the progress made. The system provides users with a visual indicator of the progress made within a given sub-step or the progress in whole of generating a color design output.

Exemplary Flow

In certain embodiments of the invention, a user will enter a flow and the following may occur:

1. User selects a subset of colors.
2. Colors are assigned a color value-agnostic color attributes.
3. A series of rules were added that:
   a. Were based on a subset of colors (and)
   b. Defined how colors could be applied in a given instance if comparable color were found in the user's subset of colors;
   c. Rule colors were also assigned color value-agnostic color attributes.
4. The color value-agnostic attribute of each color in the subset of colors to be applied to a design output are compared to each color value-agnostic attribute of each rule color.
5. The system will compute all possible design outputs within the acceptance parameters defined in the computation process.
6. For matches that meet acceptance criteria standards, the system produces a visual representation of the color application output within the given design output specimen.
7. The system shows all possible color application outputs.
8. The system produces a detailed color style guide for the application of color.
9. The system produces design style variable to be applied to pre-coded web component structures.

Optionally, the user might see a small representation of the final design output respond and change as the user makes selections down the flow.

As depicted in FIG. 1, in an embodiment of the inventive method and system is shown. FIG. 1 shows method (100) including the following steps: receive a baseline color-palette element (110); calculate various color combinations using the baseline color-palette element to create a set of outputs of color-palette elements (120); and produce a design output including the set of color-palette elements (130).

Various iterations of these steps are possible as set forth in the claims of the invention.

Figure 2:
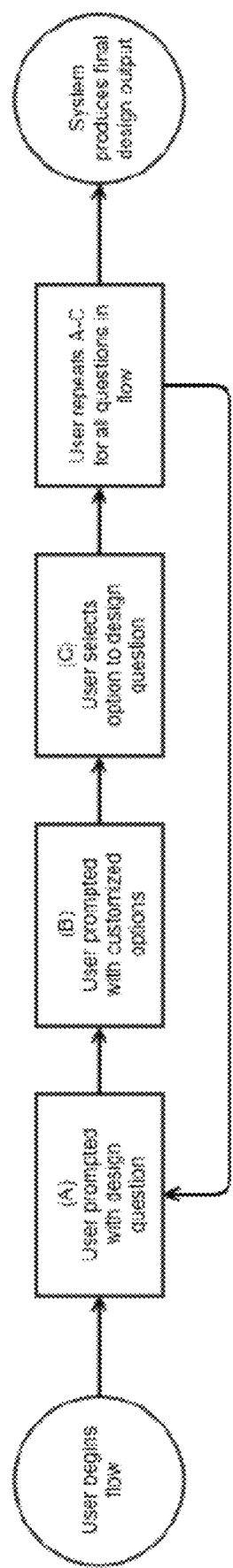
FIG. 2 is a schematic flowchart of a method of an embodiment of the invention.

As shown in FIG. 2, in an embodiment of the invention, a question/answer based flow is shown. In set (A), the user is prompted with a design question. In step (B) the user is presented with customized options. In step (C) the user selects an option to a design question. Afterwards, the user repeats steps (A)-(C) for all questions in the flow, and afterwards the system produces a final design output based upon the flow.

In certain embodiments, a preview of the final output is generated in real-time and made visible to the user.

In certain embodiments, the questions include questions relating to color palettes, color applications in a specimen, color flows, font preferences, icon style preference, illustration style preferences, and the like.

In certain embodiments, the final output is generated based on rules using custom generated design preferences, not on pre-existing templates or previously established design styles foreign to the user.

In certain embodiments, the interface can be manipulated successfully guiding users through the flow using on a toggle control and selector control.

In certain embodiments, such as with step (A), the right down arrow keys are for moving between question design options and the down arrow to select the option in focus and move to the next question.

In certain embodiments, step (B) involves using a 4-way joystick where right/left motion moves the user between question/design option and the down motion selects the option in focus and moves the user to the next question.

In certain embodiments, step (C) involves using the spacebar key in combination with the enter key, where the spacebar key moves the user through the question design options and the enter key selects the option in focus and moves the user to the next design question.

Figure 3:
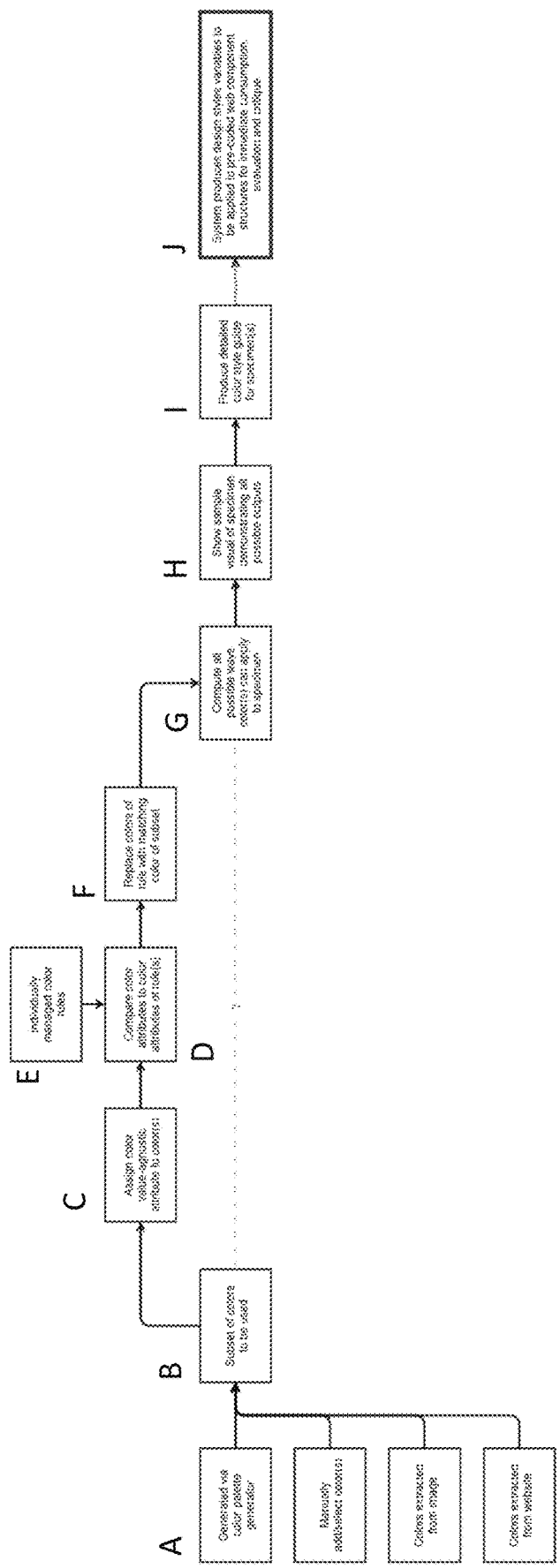
FIG. 3 is a schematic flowchart of a method and system of an embodiment of the invention.

As depicted in FIG. 3 in an embodiment of the invention a question/answer based color design flow is shown.

Sources of color palettes are presented to a user for selection (A). In certain embodiments, the sources of color palettes are generated via color palette generator, manually add/selected, colors extracted from an image, colors extracted from a website or combinations thereof.

In step (B), a user selects a subset of colors.

In step (C), selected colors are assigned color value agnostic attributes.

The color value agnostic attributes are compared to a rule set based upon the selected subset of colors, comparable colors available, and a second rule created accordingly (D & E).

In Step (F), replacing or updating the second rule set with the resulting color subset and assigning color value agnostic attributes is performed.

In Steps (G) and H), computing and applying the color value agnostic attributes for and of the resulting color subset to a design output preview.

In Step (I), the method involves computing and providing a detailed color design guide for the application of color.

In Step (J), the method involves computing and providing a design style variable to be applied to pre-coded web component structures.

This inventive color design flow provides the ability to assign color value-agnostic attributes to any color and allows colors to be compared and mapped across color palettes.

Also, the ability to add N number of color rules so that N possible applications of color for a given design may be produced.

The inventive method and system provides and allows for the comparison of colors in a subset to a color defined in a rule set, to facilitate determining possible applications of that color.

The inventive method and system provides and allows for generating all possible applications of color for a given design from any color subset.

The inventive method and system provides and allows for generating high-quality color designs that meet sound visual design standards by defining and redefining one or more color output in accordance with a rule set criterion.

Process for Matching (Color Combination)

The invention involves a method for computing possible color combinations given that the system has one or more color combination models, a method for comparing color values across a color spectrum, and a process to compare a subset of colors to the color combination model.

Steps to Generating a Color Combination Model:
  A system designed to support the input of a color combination model.
  A color combination model is comprised of one or more colors, a design output type, granular inputs on assigning colors to a whole or part of a sample design output representing a design output type
  The ability to add one or more colors.
  The ability to apply colors to a sample design output.
  The ability to apply various tactics on how one or more colors applies to a whole or part of a sample design output.

Evaluating Colors Across a Color Spectrum:
  The system has defined a color spectrum.
  The color spectrum represents a series of colors with a pure value.
  The color spectrum is placed on a grid.
  The color spectrum grid spans the width of the color spectrum.
  The color grid has an x and y axis.
  The color grid's x axis is the color spectrum.
  The color grid's y axis ranges from 20 to −20.
  The values of the y-axis of the color grid 0 represents a pure color.
  The values of the y-axis of the color grid of 1 through 20 represent adding white to the pure hue at 5% increments until at a value of 20 the color on any given x-axis value is white.
  The values of the y-axis of the color grid of −1 through −20 represent adding black to the pure hue at 5% increments until at a value of −20 the color on any given x-axis value is black.
  The grid has two parts—one part represents color values, the second part represents non-color values or shades of desaturated color, where −20 represents black and 20 represent white, where all values between −20 and 20 on the non-color portion of the grid represent shades of desaturated colors evenly shaded between white (20) down to black (−20).

The system is provided any color value.
  The system will them compare the provided color value to all points on the color grid.
  The system will determine which color or non-color value on the color grid most closely represents the color being analyzed by the system.
  Once the system maps any color value to a color or non-color value on the color grid, the system will assign the closest color or non-color value to the value being analyzed by the system. If the color being analyzed by the system is closest to a value on the color portion of the color grid, the color will be assigned a {c,#} coordinate, where the 'c' represents that the color is closest to a 'color,' and the # will represent the color's position relative to the color's shade (−19), purity (0), or tone (19). If the color being analyzed by the system is closest to a value on the non-color portion of the color grid, the color will be assigned a {n,#} coordinate, where the 'n' represents that the color is closest to a non-color, and the # will represent the non-color's position relative to the non-color's shade (−20), purity (0), or tone (20). This coordinate provides a color value-agnostic value that will allow colors from across the spectrum to be compared, regardless of what their individual color is.

Steps to Compare a Subset of Colors to a Color Combination Model:
  The system receives one or more colors to analyze.
  The system calculates the color grid coordinate for each color.
  The system references the color grid coordinates for each color within a given color combination model.
  The system compares color grid coordinates of the colors under analysis with each of the colors within a given color combination model.
  Before an output for a given color combination model can be considered for a possible output, these criteria must be met for each color combination model:
    1. For a given color combination model, there are a certain number of colors and non-colors. The subset being analyzed must contain at least the same amount or more color values than are contained in a given color combination model. If a subset has less colors than a color combination model requires, that color combination model is invalidated and does not produce a possible output for that color combination model.
    2. If the subset does have enough color values to satisfy the color combination model, each color must then be within a system-defined minimum distance from the color combination model color value's color grid coordinates. If the distance between the color combination model color value's color grid coordinates and the color subset's color grid coordinates, the color combination model is invalidated and does not produce an output.
  If a color subset has the requisite number of colors and each of the color subset value's color grid coordinates meets the minimum distance criteria as defined by the system relative to each color combination subset, the system will identify the given color combination model as a candidate for an output for the color subset under analysis.

The system will then calculate all possible color combination matches for a given color combination model. A single color combination model can produce more than one color combination output if one or more values of a subset meet the criteria for producing an output within a given color combination model for various color roles under a color combination model.

Once the system computes possible color combinations, the system will then produce the color combination outputs.

Matching Criteria

In certain embodiments, the system produces color palette elements based on matching criteria set forth in the color rule data.

One method includes providing any color palette elements from any source, irrespective of the individual color palette element attributes and then computes possible outcomes by comparing the attributes of the color palette element(s) to the attributes of the color palette elements stored in a color rule. Alternately, the system could produce one or more color palette elements guaranteed to match the criteria to produce an outcome based on the color palette element attributes stored in one or more color rules.

In certain embodiments, the system and method generates color rules based on the programmatic evaluation and extraction of colors and color applications from an existing design.

In certain embodiments, the system and method produces a range of color combination design outputs in the form of a thumbnail representation or final digital output for the purpose of visualizing a color combination in the context of its final application including but not limited to websites, blogs, computer software, mobile applications, graphic design, interior designs, architectural designs, flow charts, diagrams, illustrations, icons, brochures, advertisements, print media, digital advertisements, presentations, marketing collateral, contracts, emails, business cards, banners, automotive design, civil engineering designs, electrical designs, fashion design, fashion accessory design, motion design, construction, culinary arts, set design, stage design, and the like.

Figure 4:
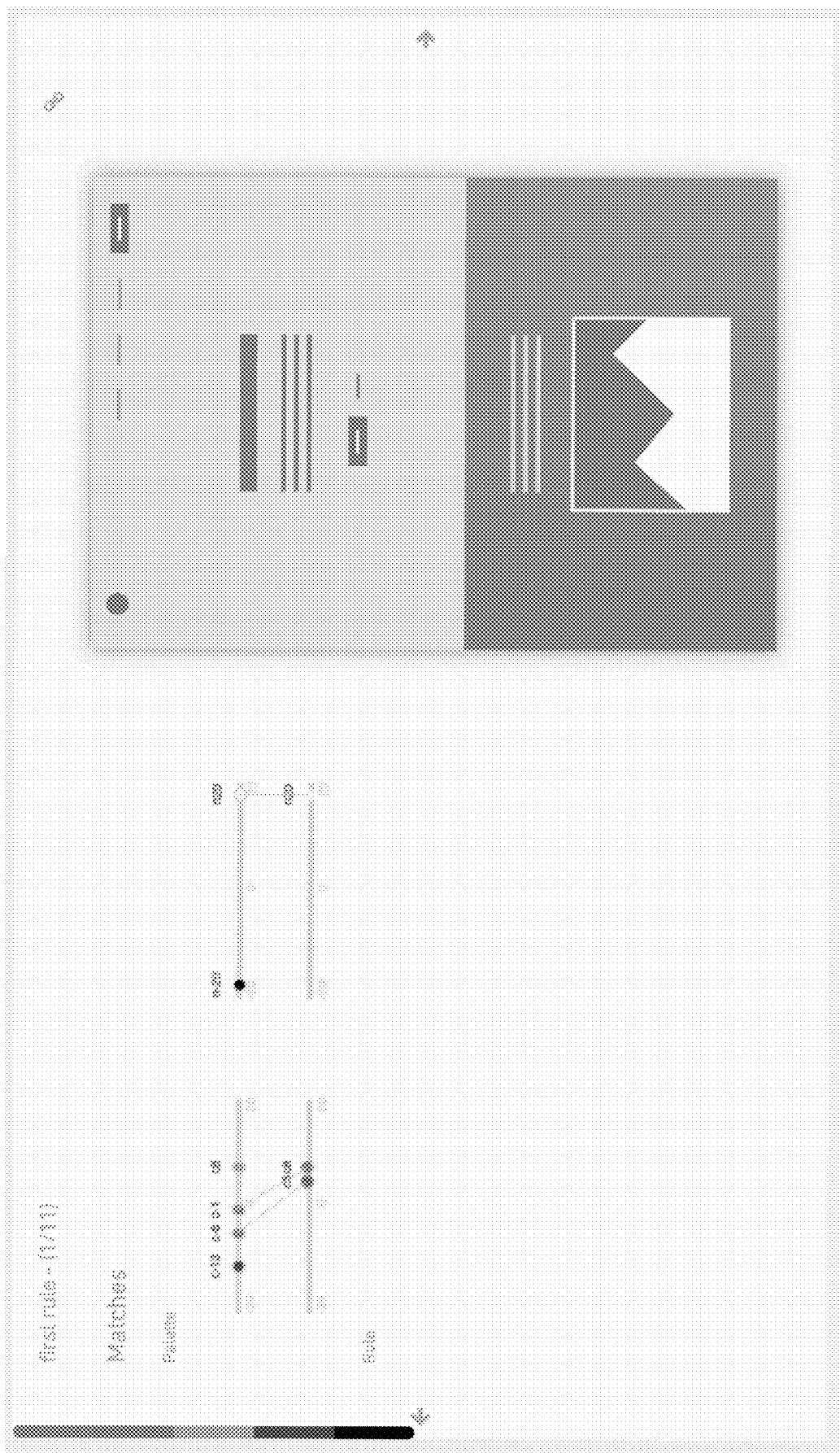
FIG. 4 is a chart showing a color matching of an embodiment of the invention.

As shown in FIG. 4, the matching criteria is shown based upon a rule. Here, color palette items c-13, c-6, c-1 and c8 are provided. Colors c-6 and c-1 are matched with colors c-5 and c-8 respectively. The matching of these colors generates a thumbnail representation of color as shown in FIG. 4.

Figure 5:
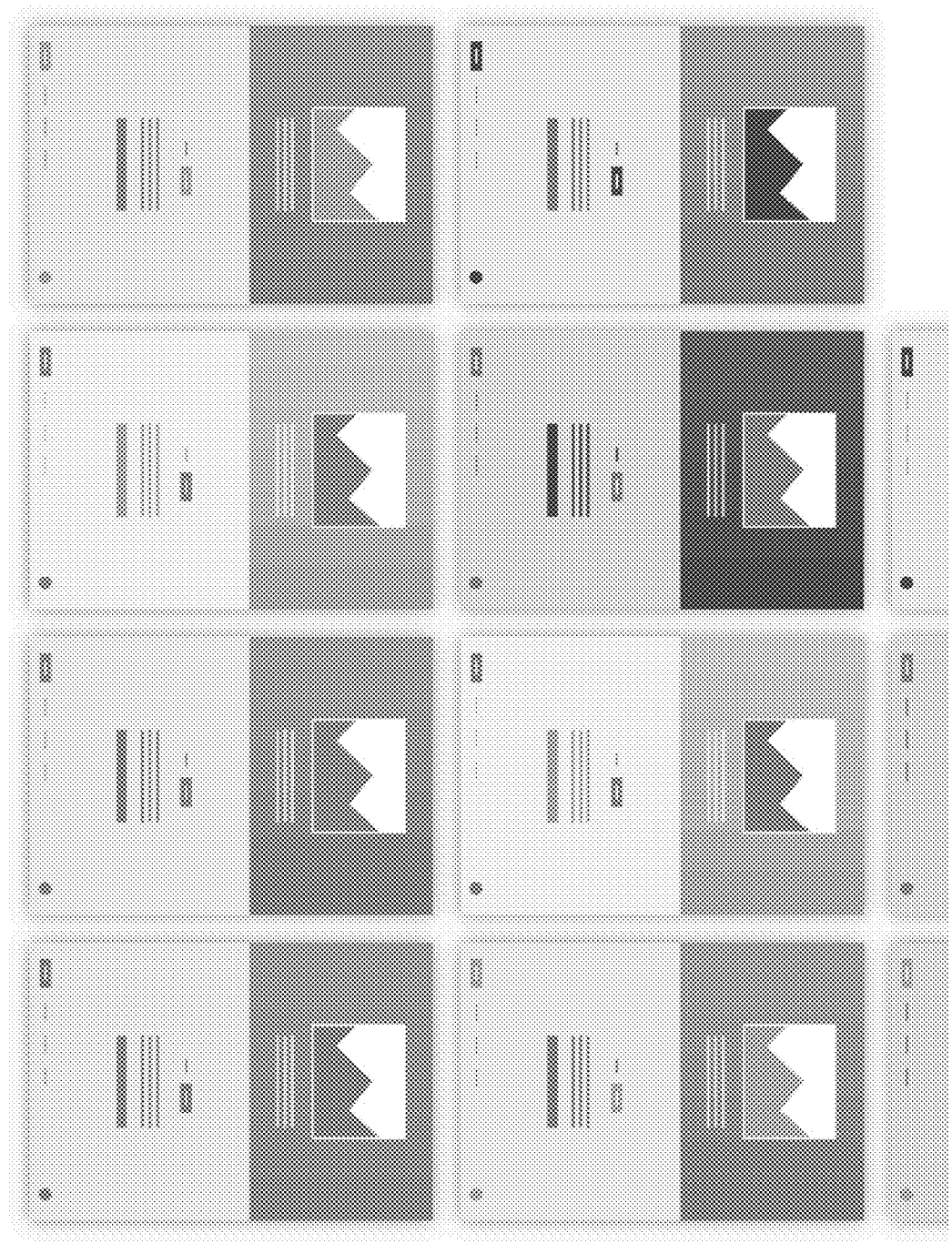
FIG. 5 shows various results of the color matching of FIG. 5
Figure 8:
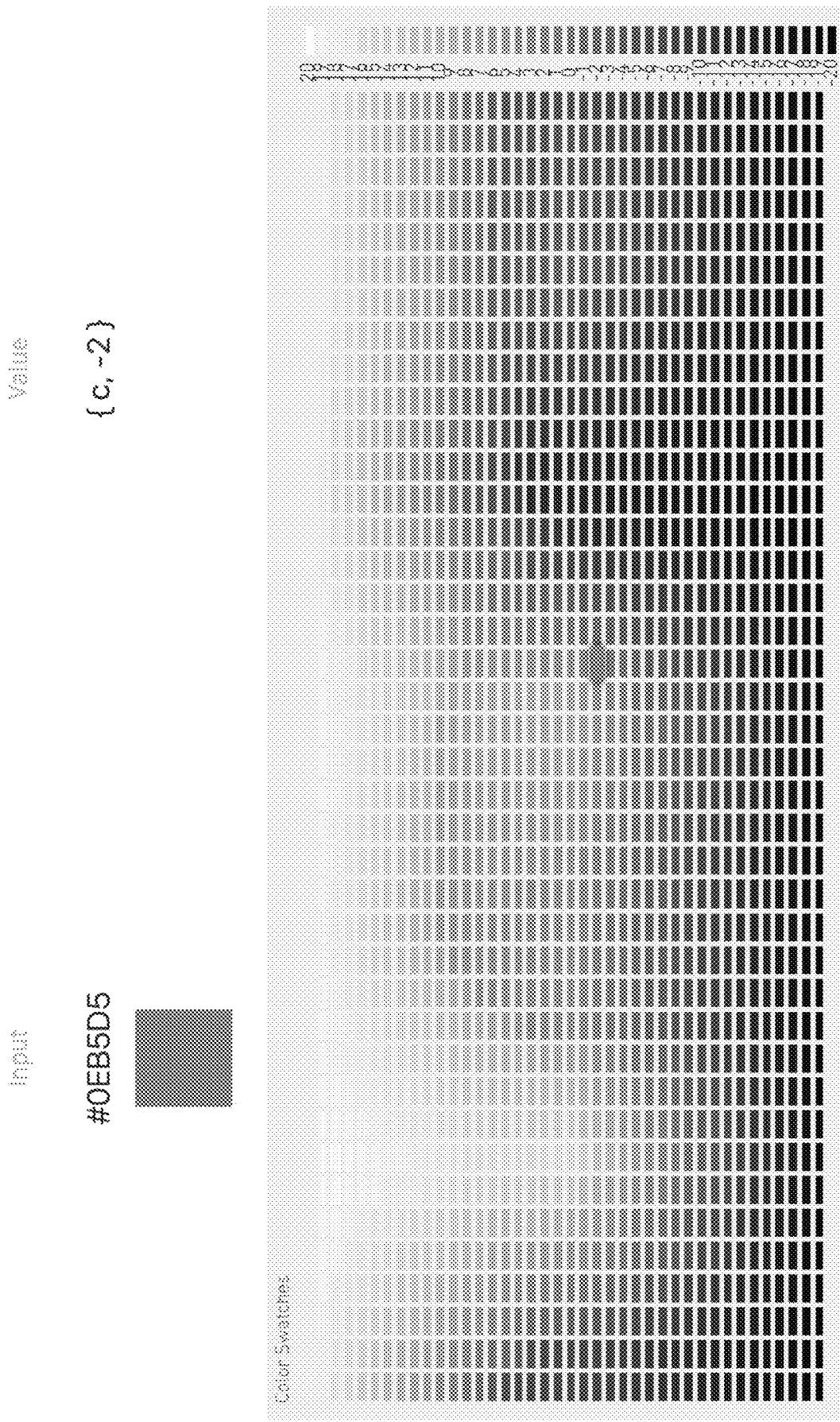
FIG. 8 shows a color grid that enables the mapping of colors across a color spectrum.

A system then selects various colors similar to the matches based upon a first rule. FIG. 5 shows a set of color matches based upon the first rule. The rule involves comparing luma and chroma values and finding colors that are similar to the color table as shown in FIG. 8. Based upon the rule match, the colors are automatically generated and presented to a user as a set of color palette options.

The system is able to quickly create these color options, which according to the prior art was difficult and time consuming to create.

Figure 6:
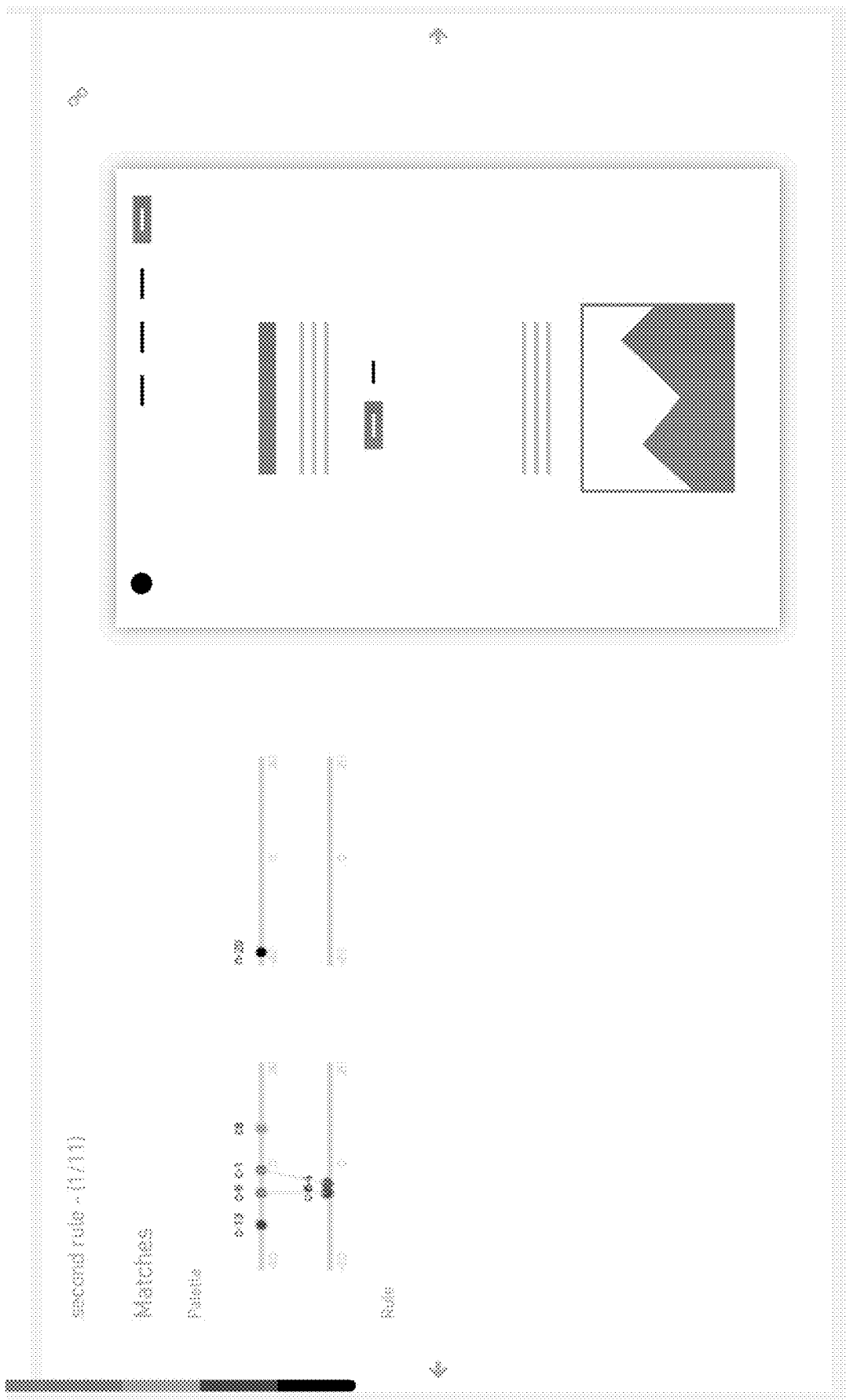
FIG. 6 is a chart showing a color matching of an embodiment of the invention.

FIG. 6 shows a second rule match whereby c-13, c-6, c-1 and c8 are provided. Colors c-6 and c-1 are matched with colors c-5 and c-8 respectively, however, additional black −20 shades were added to the baseline colors c-6 and c-4, thus affecting the rule.

Figure 7:
FIG. 7 shows various results of the color matching of FIG. 7.

Based upon the rule, a different color match is provided and FIG. 7 shows a set of color matches based upon the second rule as thumbnails to a user. In this embodiment, the background is white, while the colors are generated to contrast with white and pop based upon the white background.

FIG. 8 shows a color table whereby the values of the y-axis of the color grid 0 represents a pure color. The values of the y-axis of the color grid of 1 through 20 represent adding white to the pure hue at 5% increments until at a value of 20 the color on any given x-axis value is white. The values of the y-axis of the color grid of −1 through −20 represent adding black to the pure hue at 5% increments until at a value of −20 the color on any given x-axis value is black. The grid has two parts—one part represents color values, the second part represents non-color values or shades of desaturated color, where −20 represents black and 20 represent white, where all values between −20 and 20 on the non-color portion of the grid represent shades of desaturated colors evenly shaded between white (20) down to black (−20).

Computer System & System Architecture

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps in the invention can be performed by a programmable processor execution a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language.

Suitable processors include, by way of example, both general and special purpose microprocessors. Generally, a processor will receive instructions and data from a read-only memory and/or a random-access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and optical disks. Any of the foregoing can be supplemented by, or incorporated in, ASICs (application-specific integrated circuits).

FIG. 9 conceptually illustrates a computer system with which some embodiments of the invention are implemented. The computer system 2100 includes a bus 2105, a processor 2110, a system memory 2115, a read-only memory 2120, a permanent storage device 2125, input devices 2130, and output devices 2135. In some embodiments, the computer system also includes a graphic processing unit (GPU) 2175.

The bus 2105 collectively represents all system, peripheral, and chipset buses that support communication among internal devices of the computer system 2100. For instance, the bus 2105 communicatively connects the processor 2110 with the read-only memory 2120, the system memory 2115, and the permanent storage device 2125.

From these various memory units, the processor 2110 (also referred to as central processing unit or CPU) retrieves instructions to execute and data to process in order to execute the processes of the invention. The read-only-memory (ROM) 2120 stores static data and instructions that are needed by the processor 2110 and other modules of the computer system.

The permanent storage device 2125, on the other hand, is a read-and-write memory device. This device is a non-volatile memory unit that stores instruction and data even when the computer system 2100 is off. Some embodiments of the invention use a mass-storage device (such as a magnetic or optical disk and its corresponding disk drive) as the permanent storage device 2125. The permanent storage device 2125 may be a fully solid-state storage, a conventional "spinning magnetic pallet" storage (i.e. hard-drive), or combinations thereof.

Other embodiments may use a removable storage device (such as a USB flash drive or SD Memory Card) as a temporary storage or as the permanent storage device 2125.

Like the permanent storage device 2125, the system memory 2115 is a read and write memory device. However, unlike storage device 2125, the system memory is a volatile read-and-write memory, such as a random-access memory. The system memory stores at least some of the instructions and data that the processor needs at runtime.

Instructions and/or data needed to perform processes of some embodiments are stored in the system memory 2115, the permanent storage device 2125, the read-only memory 2120, or any combination of the three. For example, the various memory units may contain instructions for processing multimedia items in accordance with some embodiments. From these various memory units, the processor 2110 retrieves instructions to execute and data to process in order to execute the processes of some embodiments.

The bus 2105 also connects to the input and output devices 2130 and 2135. The input devices enable the user to communicate information and select commands to the computer system. The input devices 2130 include alphanumeric keyboards, touch panels, and cursor controllers. The input devices 2130 also include scanners through which an image can be input to the computer system. The output devices 2135 display images generated by the computer system. The output devices may include printers, pen plotters, laser printers, ink-jet plotters, film recorders, and display devices, such as cathode ray tubes (CRT), liquid crystal displays (LCD), or electroluminescent displays.

As shown in FIG. 9, bus 2105 also couples computer 2100 to a network 2165 through a network adapter (not shown). In this manner, the computer can be a part of a network of computers (such as a local area network ("LAN"), a wide area network ("WAN"), or an Intranet) or a network of networks (such as the Internet). Finally, as shown in FIG. 4, the computer system in some embodiments also optionally includes a graphics processing unit (GPU) 2175. A GPU (also referred to as a visual processing unit or a display processor) is a dedicated graphics rendering device which is very efficient in manipulating and displaying computer graphics. The GPU can be included in a video card (not shown) or can be integrated into the mother board of the computer system along with the processor 2110. Also, the computer system 2100 may be used as a personal computer, a workstation, a game console, or the like. Any or all of the components of computer system 2100 may be used in conjunction with the invention. However, one of ordinary skill in the art will appreciate that any other system configuration may also be used in conjunction with the invention.

Having thus described several embodiments for practicing the inventive method, its advantages and objectives can be understood. Variations from the drawings and description can be made by one skilled in the art without departing from the scope of the invention, which is to be determined from the following claims.

Accordingly, this invention is not to be limited by the embodiments as shown in the drawings and/or as described in the description, since these are given by way of example only and not by way of limitation.

What is claimed is:

1. A system for analyzing color-palette data elements for producing color combinations in a design output by a software program, the system comprising:
   a processor; and
   software executing on the processor configured to:
   a. receive a baseline color-palette element;
   b. calculate various color combinations using the baseline color-palette element to create a set of outputs of color-palette elements; and
   c. produce a design output including the set of outputs of color-palette elements,
   wherein the design output is code for a website, an email, a mobile application interface, a user interface (UT), a software program file, an image, a presentation, an advertisement, a pitch deck, a social ad, a software dashboard, or combinations thereof,
   wherein the set of outputs include the baseline color-palette element,
   wherein the design output contains a color combination that includes the baseline color-palette element and wherein the baseline color-palette element includes hex values, rgb values, rgba values, and combinations thereof.

2. The system of claim 1, wherein the software calculates various color combinations using the baseline color-palette element by:
   assigning a digital value to the baseline color-palette element;
   generating a series of color-palette elements having attributes similar to the baseline color-palette element; and
   assigning digital values to the series of generated color-palette elements.

3. The system of claim 2, the design output includes a series of the digital values of the generated color-palette elements.

4. The system of claim 2, wherein the attributes similar to the baseline color palette elements includes chroma or luma values of the baseline color-palette element.

5. The system of claim 2, wherein the software generates a series of color-palette elements by:
   analyzing the chroma or luma values of the baseline element;
   increasing the chroma or luma values by adding white to the baseline element; and
   generating at least one color-palette element having a chroma or luma value greater than the baseline element.

6. The system of claim 2, wherein the software generates a series of color-palette elements by:
   analyzing the chroma or luma values of the baseline element;
   decreasing the chroma or luma values by adding black to the baseline element; and
   generating at least one color-palette element having a chroma or luma value less than the baseline element.

7. The system of claim 2, wherein the software generates a series of color-palette elements by generating a range of color-palette elements having a greater hue intensity and a lesser hue intensity that the baseline color-palette element.

8. The system of claim 2, wherein the software comprises a rule to generate the series of color-palette elements, the rule comprising:
   mapping the chroma or luma values of the baseline color-palette element according to a chart from −20 to +20, −20 representing the lightest color ranking and +20 representing the darkest color ranging;
   generating a series of color-palette elements having chroma or luma values that are within a range of five color rankings.

9. The system of claim 2, wherein the software receives a second baseline color-palette element, wherein the software generates a second series of digital values of generated color-palette elements similar to the second baseline color-palette element.

10. The system of claim 1, wherein the system is automatic.

11. The system of claim 1, wherein the design output is for a software code or for a software program.

12. A computer-implemented method of and for mapping color-palette data elements for a software program, the method comprising the steps of:
   a. receiving a baseline color-palette element;
   b. calculating various color combinations using the baseline color-palette element to create a set of outputs of color-palette elements; and
   c. producing a design output including the set of color-palette elements,
   wherein the design output is code for a website, an email, a mobile application interlace, a user interface (UI), a software program file, an image, a presentation, an advertisement, a pitch deck, a social ad, a software dashboard, or combinations thereof,
   wherein the set of outputs include the baseline color-palette element and wherein the design output contains a color combination that includes the baseline color-palette element; and
   wherein the step of receiving comprises a series of questions relating to color palettes, color application in a specimen, color flows, font preferences, image style preferences, icon style preferences, illustration style preferences and a combination thereof.

13. The method of claim 12, wherein the step of calculating comprises:
   assigning a digital value to the baseline color-palette element;
   generating a series of color-palette elements having attributes similar to the baseline color-palette element; and
   assigning digital values to the series of generated color-palette elements.

14. The method of claim 13, the design output includes a series of the digital values of the generated color-palette elements.

15. The method of claim 12, wherein the design output is generated in real-time.

16. The method of claim 12, wherein the design output is generated based on rules using custom generated color preferences and is not based upon pre-existing templates or previously established colors.

17. The method of claim 12, wherein the method is dynamic and wherein there are different sets of color-palette data elements presented to the user depending upon the previous color-palette data elements selected by the user.

* * * * *